United States Patent [19]

Kutsch et al.

[11] Patent Number: 5,335,349
[45] Date of Patent: Aug. 2, 1994

[54] TELECOMMUNICATION OVERHEAD CABLE DISTRIBUTION ASSEMBLY

[75] Inventors: Duane B. Kutsch, Otis Orchards; Lloyd W. Lohf, Spokane, both of Wash.

[73] Assignee: Telect, Inc., Liberty Lake, Wash.

[21] Appl. No.: 990,980

[22] Filed: Dec. 14, 1992

[51] Int. Cl.⁵ .............................................. G02B 6/44
[52] U.S. Cl. ..................................... 455/6.1; 385/134; 385/135; 385/137
[58] Field of Search .................... 455/3.1, 6.1; 358/86; 385/134, 135, 137, 147

[56] References Cited

U.S. PATENT DOCUMENTS 5,142,606 8/1992 Carney et al. ...................... 385/134

OTHER PUBLICATIONS

Igus Inc., "Energy Chain System," Apr. 1992.
AT&T, "Fiber Protection System," 1989.
ADC Telecommunications, "FiberGuide Fiber Management System," 1991.
Hendry Telephone Products Brochure, 1992.
Porta Systems Corp., "Fiber Management System," date unknown.

Primary Examiner—Reinhard J. Eisenzopf
Assistant Examiner—Andrew Faile
Attorney, Agent, or Firm—Wells, St. John, Roberts, Gregory & Matkin

[57] ABSTRACT

The disclosed telecommunication overhead cable distribution system 10 includes a plurality of "T"-shaped distribution units 20 that are located at desired distribution locations. A plurality of cable support sections 22 extend, protect, and support the telecommunication cables between the distribution locations. Each section includes a plurality of identical support units 24 that are releasably interconnected to each other. Each unit is pivotable about a horizontal intra-unit axis "A" and about an inter-unit vertical axis "B". Each unit is comprised of a female member 26 and a male member 28 in which the male member is releasably interlocked with an adjacent female member. Such a system provides for a system having a minimum of components with a maximum of versatility. The ends of the section 22 fit into receptive cavities formed in the "T"-shaped distribution units 20.

12 Claims, 10 Drawing Sheets

TELECOMMUNICATION OVERHEAD CABLE DISTRIBUTION ASSEMBLY

TECHNICAL FIELD

This invention relates to telecommunication overhead cable distribution systems for distributing telecommunication cables to and from termination panels and, more particularly those systems that are particularly adapted for distributing single strand or multiple strand fiber optic cables.

BACKGROUND OF THE INVENTION

Almost all present day overhead cable distributions systems must be customized to fit the required physical space and layout of the telecommunication termination panels and other telecommunication equipment in a centralized telecommunication location. Such customized overhead cable distribution systems normally use some form of rather rigid channel design utilizing a substantial number of different interconnecting components.

The time and financial resources required to select and arrange the components to meet the customized requirements are substantial. It is not unusual for the designers and installers to have to cut or modify many of the components so that the components will fit the layout and facilitate installation. Sometimes, it becomes a "nightmare" to select the right components and to make the proper interconnection of the components without having a large number of unused or damaged parts left over.

The problem is magnified as the number of telecommunication cables increases. Furthermore, the problem is made more difficult with the increase in directional changes of the orientations of the cables, either laterally and vertically between destinations. It is not unusual for a user or supplier to need special expertise in the layout and installation of telecommunication cable in an overhead system. Consequently the cost of the physical hardware itself is generally a small fraction of the total cost of installing an overhead telecommunication cable system. However, the design and configuration of the physical hardware and components play a significant role in the layout design and installation costs.

One of the objects of this invention is to dramatically reduce the number of different parts or components required to build a rather complex overhead telecommunication cable distribution system.

Another object of this invention is to significantly increase the ease of layout and decrease the cost of installation.

These and other objects and advantages of this invention will become apparent upon reading and reviewing the drawings and description of a preferred embodiment of this invention.

BRIEF DESCRIPTION OF THE DRAWINGS

Preferred embodiments of the invention are described below with reference to the accompanying drawings, which are briefly described below.

FIG. 13 is an isometric view of a "T"-shaped distribution unit;

FIG. 14 is a plan view showing the distribution unit being connected to cable support sections;

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
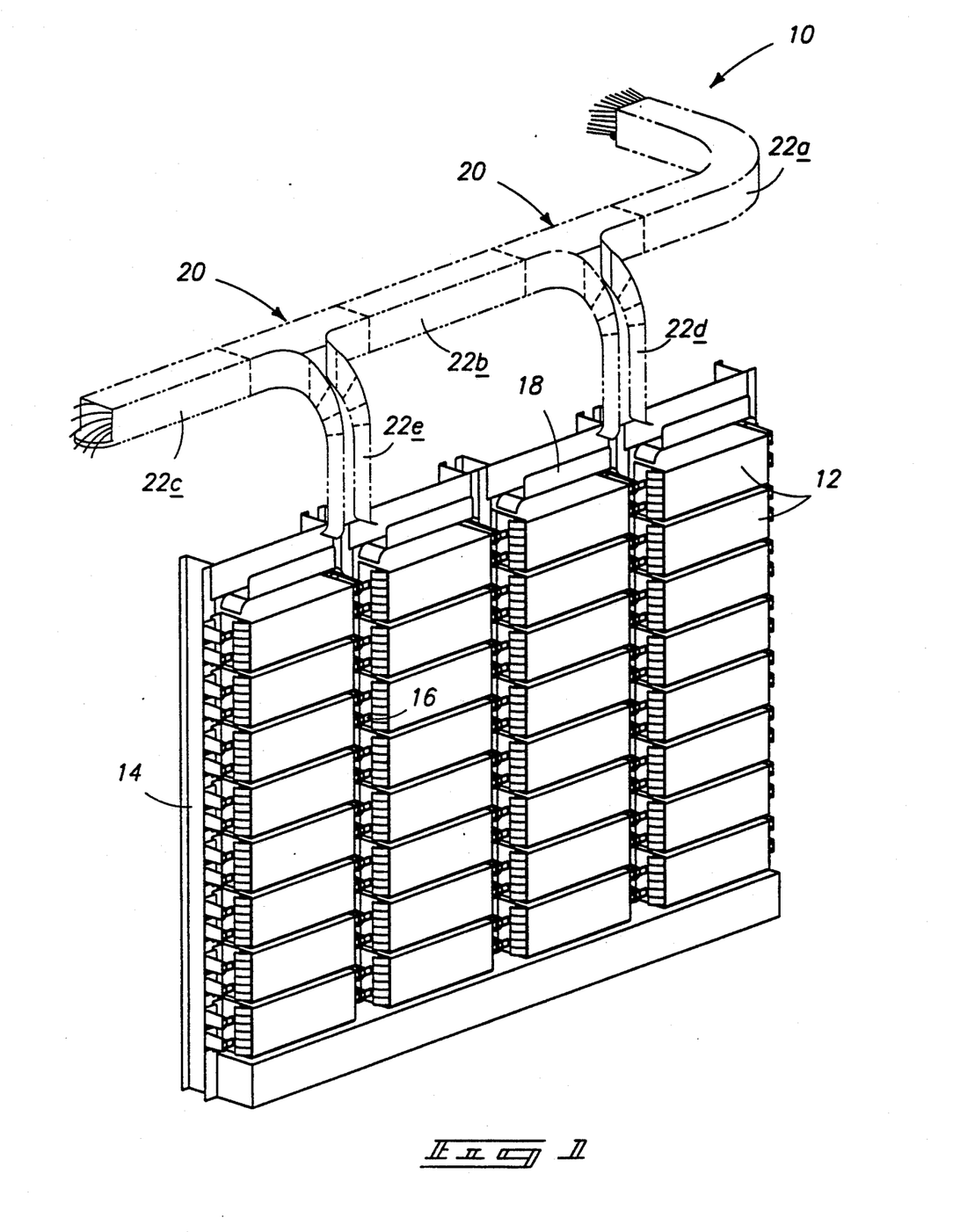
FIG. 1 is an isometric view of a preferred embodiment of a telecommunication overhead cable distribution system illustrating the distribution of telecommunication cables to and from circuit termination panels with the telecommunication cables supported by sections extending between "T"-shaped distribution units.

A preferred embodiment of the telecommunication overhead cable distribution system is illustrated in FIG. 1, and is generally identified with the numeral 10. The system 10 distributes telecommunication cables, either single-strand or multi-strand, to and from telecommunication termination panels 12 that are mounted in vertical racks 14. The system 10 is capable of supporting and distributing a large number of cables for a telephone central office having multiple rows of racks 14, as well as distributing a small number of cables in a rather remote termination facility.

Generally, the racks 14 have vertical channels 16 and horizontal channels 18 for receiving the cables from the overhead distribution system 10 and directing the cables to desired signal termination panels 12.

The overhead distribution system 10 can be either suspended from a ceiling or roof or supported by the racks 14 at a convenient location above the panels 12. One of the main advantages of the system 10 is its diversity and its universality.

The system 10 generally includes a plurality of single or double "T"-shaped distribution units 20, positioned at desired overhead distribution locations. The system 10 includes intermediate cable support sections 22 that extend, protect and support the cables between the desired overhead distribution locations. Generally, three or four cable support sections 22 intersect at a distribution location and connect to a distribution unit 20 as illustrated in FIG. 1. Each of the sections 22 are capable of supporting the cables in straight or curved orientations in flat or inclined directions. For example, as illustrated in FIG. 1, section 22a has a curved 90° horizontal orientation, while sections 22b and 22c have straight horizontal orientations. Sections 22d and 22e extend downward in a curved 90° orientation, distributing the cables from the units 20 to the rack channels 16 and 18.

Each of the sections 22 incorporates a multiple of essentially identical, releasable interlocking articulate cable support units 24 (FIGS. 3 and 5) that are capable of being interconnected to form straight or curved sections 22 that extend horizontal or vertical, and visa versa.

Figure 2:
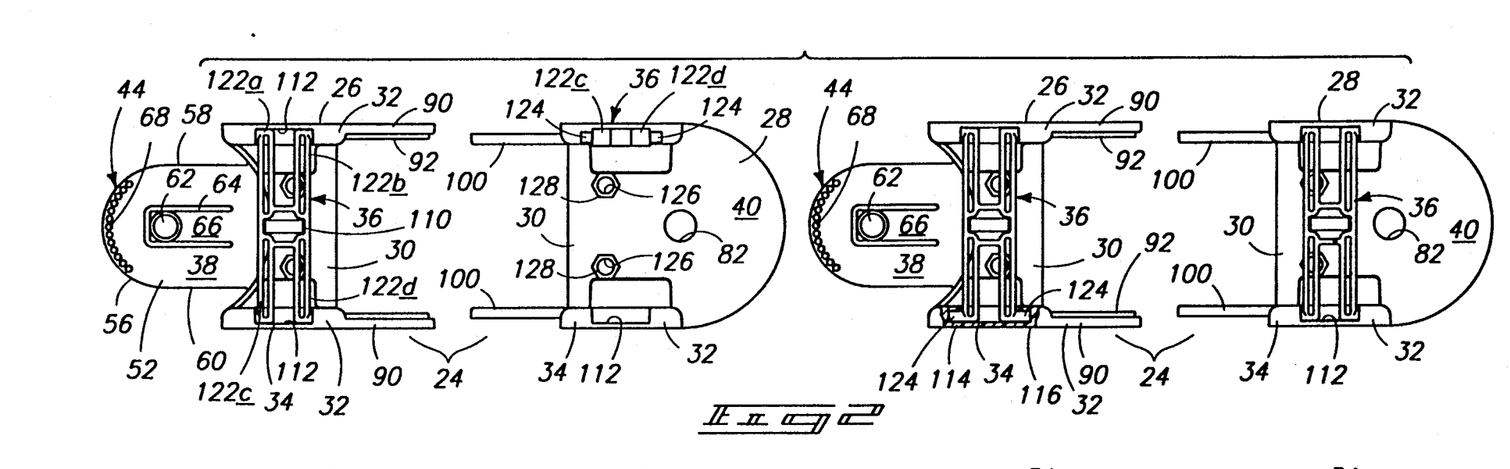
FIG. 2 is a top view of two section units that are shown in an unconnected configuration.
Figure 3:
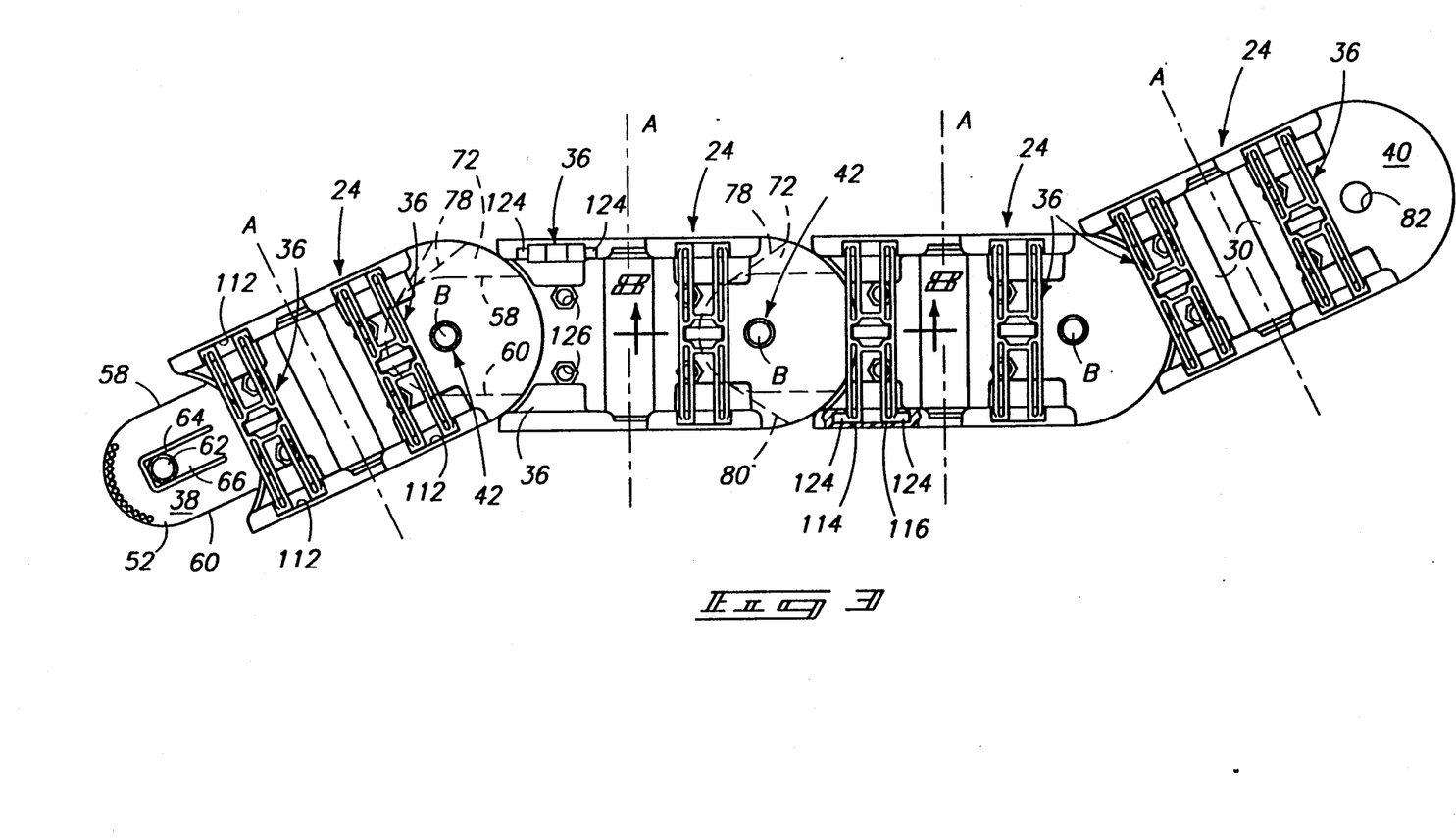
FIG. 3 is a top view of four section units that are interconnected with the outer two units shown at pivoted angles relative to the inner two units to direct the cables in curved lateral directions.

Each of the articulate cable support units 24 (FIGS. 2 and 4) comprises a male member 26 and a female member 28 that are operatively interconnected to each other for selective pivotal movement in a vertical plane about an intra-unit horizontal axis "A" (FIG. 3). Furthermore, the male member 26 of one unit is operatively interconnected to a female member 28 of an adjacent unit 24 for selective pivotal movement in a horizontal plane about an inter-unit vertical axis "B" (FIG. 5).

Each of the male and female members 26, 28, has a base 30 and spaced sidewalls 32 that extend upright from the base 30, terminating in upper ends that have latch supports 34. Each of the male and female members 26, 28 has a latch 36 that extends between the upper ends of the sidewall 32, interconnecting with the latch supports 34 (FIG. 2) forming an openable enclosure to receive and protect the cables.

Figure 9:
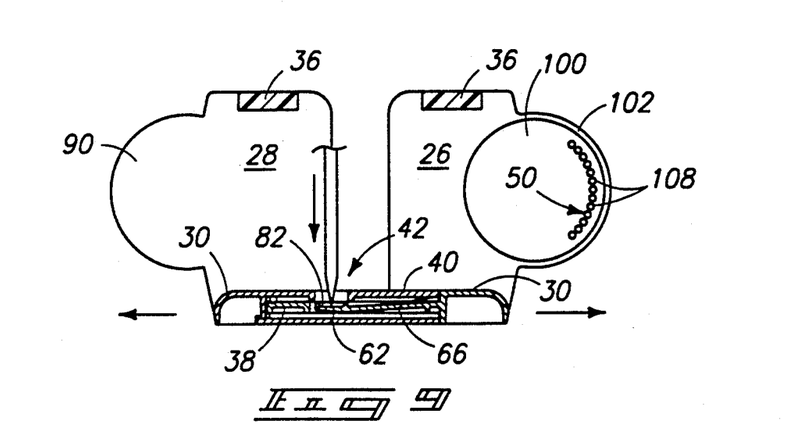
FIG. 9 is a fragment vertical cross-sectional view similar to FIG. 8, except showing a tool being used to disconnect a female member from a male member.

The male member 26 has male connecting element 38 that releasably mates with a corresponding female connecting element 40 of a female member 28 of an adjacent unit 24 (FIG. 2). The corresponding male and female connecting elements 38, 40 have releasable locking means 42 (FIG. 3) for releasably interlocking the male and female connecting elements as illustrated FIGS. 3, 8 and 9. FIG. 2 illustrates the male and female connecting elements 38, 40 in unlocked, separated positions. FIG. 9 illustrates the use of a tool for releasing the locking means 42 to separate the units 24 when desired. Normally the male and female connecting elements 38 and 40 will remain in their locked position once the corresponding section 22 is installed.

The corresponding male and female connecting elements 38, 40 further comprise a horizontal angle adjusting means 44 operatively interconnecting elements 38, 40 for permitting the elements 38, 40 to be pivoted horizontally about the inter-unit vertical axis "B" to selected angles, preferably less than 30° in either direction from a center line orientation. The horizontal angle adjusting means 44 permits the units 20 to be interconnected to each other at various angles, each preferably less than 30°, to enable the cables to be supported in horizontally curved orientations such as illustrated by section 22a in FIG. 1.

The male and female members 26, 28 have vertical angle adjustment means 50 (FIG. 4) for permitting vertical adjustment of the members 26, 28 about the intra-unit horizontal axis "A".

Each of the male connecting elements 38 includes a top surface 52, a bottom surface 54, a curved outer surface 56 and parallel side surfaces 58 and 60. A cylindrical upward projection 62 is formed in the male connecting elements 38 projecting above the top surface 52 for interconnecting with the female connecting element 40.

The male connecting element 38 has a "U"-shaped groove 64 (FIG. 2) formed therein, surrounding the cylindrical upward projection 62 forming a spring arm 66 (FIGS. 2, 8 and 9) for supporting the cylindrical upward projection 62. The cylindrical upward projection 62 and its supporting spring arm 66 form part of the releasable locking means 42.

The male connecting element 38 further includes detent indentations 68 (FIGS. 2 and 10) formed adjacent the curved outer surface 56 forming an arc having an axis of curvature corresponding to the axis "B". The detent indentations 68 constitute a part of the horizontal angle adjusting means 44.

The female connecting element 40 has a male receiving cavity 72 that extends from a front opening 74 to a rear curved cavity wall 76. The cavity 72 has side abutment walls 78 and 80 which extend outward at an angle of less than 30° and preferably 25° with respect to a center line. The side abutment walls 78 and 80 limit the pivotal movement of the male connecting element 38 relative to the female connecting element 40 to prevent pivotal movement in either lateral direction beyond the 25° angle. When pivoted to the maximum extend, the male connecting element side surfaces 58 or 60 engage the side abutment walls 78 or 80 to prevent further pivotal movement.

The female connecting element 40 has a cylindrical aperture 82 for receiving the cylindrical upward projection 62 of the male connecting element 38 to define the inter-unit vertical pivot axis "B". The aperture 82 in conjunction with the cylindrical upward projection 62 and the spring support arm 66 define the releasable locking means 42.

During assembly, it is merely necessary to insert the male connecting element 38 into the cavity 72 of the female connecting element 42 until the cylindrical upward projection 62 is aligned with the aperture 82. At this point, the cylindrical upward projection 62 springs into the aperture 82 providing a releasable locking means 42 to secure adjacent units 24. As illustrated in FIG. 9, units 24 may be separated by inserting a tool through the aperture 82 depressing the projection 62 from the aperture 82, and then applying opposing forces to pull the female member 26 and the male member 28 from each other to disconnect the unit 24. Upon insertion and installation, the spring biased projection 62 merely snaps into the aperture 82 upon proper insertion. Consequently, attachment or interconnection of the units is quite easy and minimizes installation effort and time.

Figure 10:
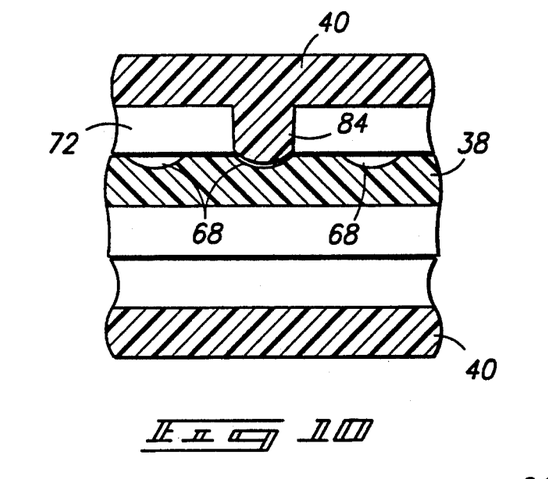
FIG. 10 is a fragmentary vertical cross-sectional view taken along line 10—10 in FIG. 8, showing a horizontal angle adjustment means for adjusting the horizontal angle about the vertical inter-unit axis between adjacent units.

As part of the horizontal angle adjusting means 44, the female connecting element 40 includes detent projections 84 (FIG. 10) that project into the cavity 72 complementary to the detent indentations 68 formed in the male connecting element 38. FIG. 10 illustrates a detailed view of the detent projections 84 projecting into the detent indentations 68. In a preferred embodiment, the detent indentations 68 are positioned at approximately 8.5° from each other to enable the male connecting element 38 to be incrementally stepped 8.5° at a time. When the desired angular configuration is obtained (less than 25° in either direction from the center line), the detent projections will secure the male connecting element and the female connecting element 40 in the desired angular orientation until sufficient angular force is again applied to the male member 26 and the female member 28 to move the detent projections 84 to adjacent indentations 68.

Figure 4:
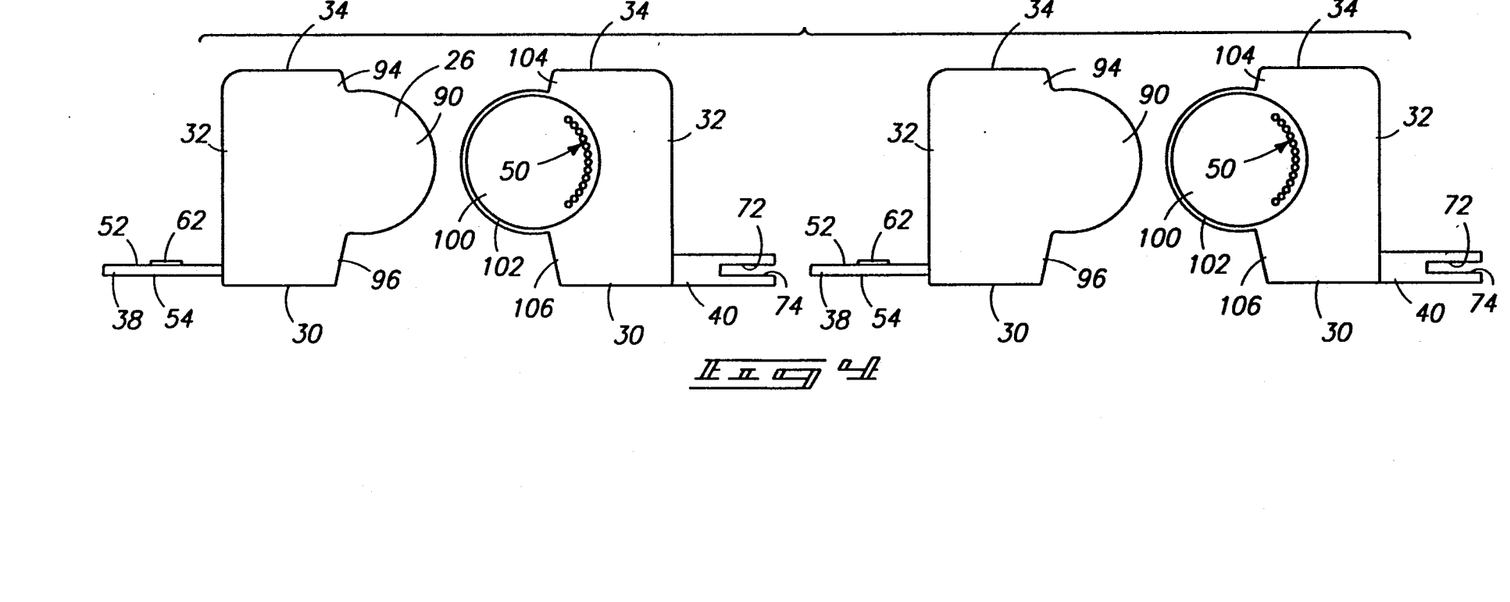
FIG. 4 is a side view of the two sections illustrated in FIG. 2.
Figure 5:
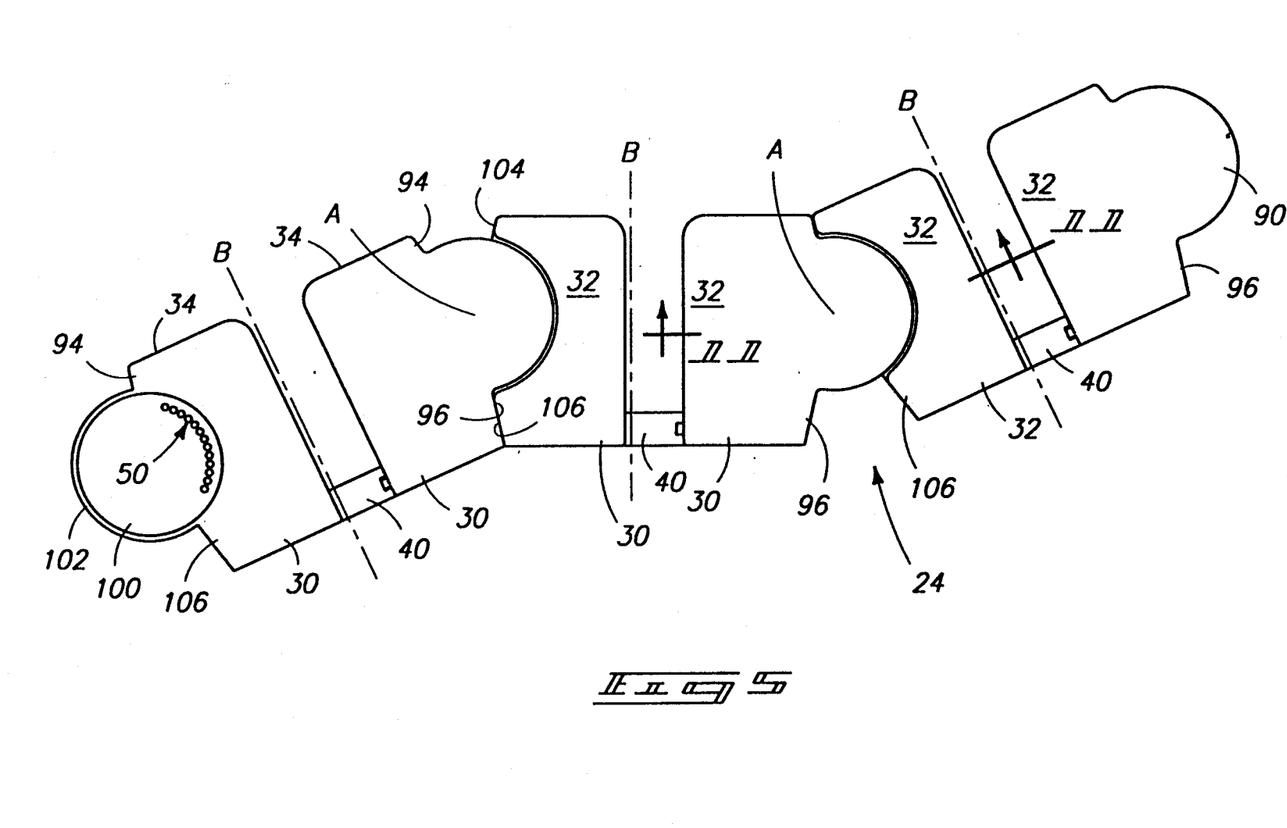
FIG. 5 is a side view of two sections that are interconnected and pivoted about intra-unit horizontal axes to direct the cables in curved elevational directions.

As illustrated in FIGS. 2 and 4, the sidewalls 32 of the male members 26 have parallel panels 90 extending opposite directions from the male connecting element 38. Each panel 90 has an inward projecting cylindrical surface 92 that is coaxial with the horizontal intra-unit axis. The male member 26 has an upper abutment surface 94 and a lower abutment surface 96 (FIGS. 4 and 5) that are positioned with respect the panel 90 to limit the angular displacement of the male member about the horizontal intra-unit axis "A". The sidewall 32 of the female member 28 has a complementary panel 100 that extends in the opposite direction from the female connecting element 40, complementary overlapping and pivotally interconnecting with the panel 90. The panel 100 includes an outer ring or hub 102 that fits over the inward projecting cylindrical surface 92 to rotate with respect to the surface 92 about the intra-unit axis. The female member 28 includes an upward abutment surface 104 for engaging with the complementary upward abutment surface 94 of the male member to limit the upward pivotal movement of the members 26, 28 relative to each other as illustrated in FIG. 5. Likewise, the female member 28 has a lower abutment surface 106 for engaging the lower abutment surface 96 of the male member 26 to limit the downward pivotal movement of the members 26, 28 about the horizontal intra-unit axis "A".

Figures 6, 7, 8:
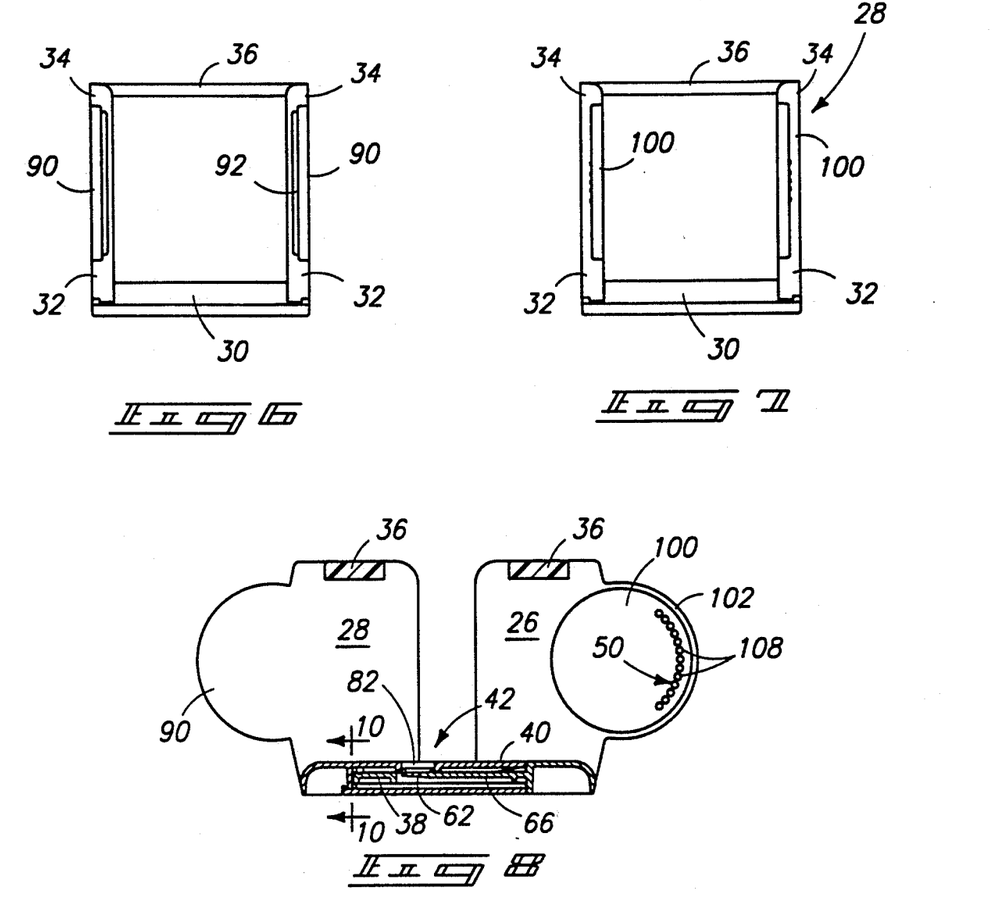
FIG. 6 is an end view of a male member of a unit as viewed from the right in FIG. 5.
FIG. 7 is an end view of a female member of a unit as viewed from the left in FIG. 5.
FIG. 8 is a fragmentary vertical cross-sectional view taken along line 8—8 in FIG. 3.
Figure 12:
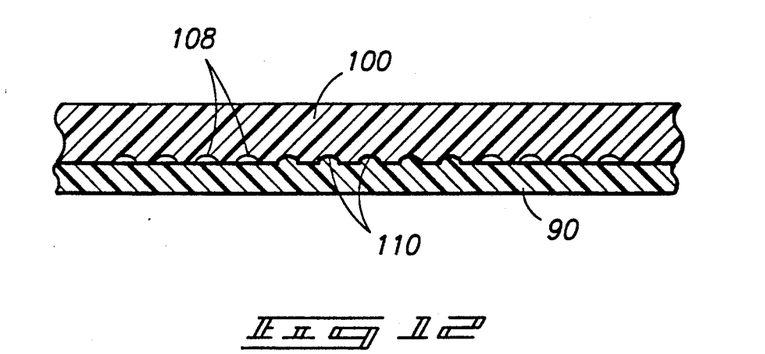
FIG. 12 is horizontal cross sectional view taken along curved line 12—12 in FIG. 5.

As part of the vertical angle adjusting means 50, the female panel 100 has detent indentations 108 as illustrated in FIGS. 8, 9 and 12. Complementary detent projections 110 are formed on an inward projecting cylinder surface 92 for projecting into the detent indentations 108 as illustrated in FIG. 12.

The detent indentations 108 and the detent projections 110 form the vertical angle adjusting means 50 for enabling the male member 26 and the female member 28 to be selectively pivoted about the horizontal intra-unit axis "A" for directing and supporting the telecommunication cables in inclined or angular vertical orientations. The extent of the angular orientation is limited by engagement of the upper abutment surfaces 94 and 104, and the lower abutment surfaces 96 and 106. Preferably, the maximum angular adjustment of each unit about its intra-unit horizontal axis is less than 30° and preferably 25°. In the preferred embodiment, the indentations 108 are positioned at intervals of 8.5° to enable the units to be set at selected angles and maintained at such angles until sufficient pivotal forces are applied to change the angles.

Referring now to FIGS. 2 and 3, the latch supports 34 at the upper ends of the sidewalls 32 include inward facing recesses 112. Associated with each of the recesses 112 are end sockets 114 and 116 formed in the upper ends communicating with the latch recesses 112.

The latch 36 as illustrated in FIG. 3 includes a central body 110 with elongated spring legs 122a–d. The latch 36 spans the distance between the upper ends of the sidewalls 32, and project into the recesses 112. Each of the legs 122 has a stub pivot shaft 124 formed integrally thereon for projecting into a respective socket 112, 116. The stub pivot shafts 124 serve as pivot shafts for the latch 36 to enable the latch to be released from one of the sidewalls and pivoted upward on the other sidewall. The elongated spring legs 122 may be laterally compressed to remove the stub pivot shaft 124 from its respective socket 114, 116 to remove one end of the latch from one of the sidewalls and to enable the latch to be pivoted upward about the stub pivot shafts 124 at the other end of the latch 36 as illustrated in FIG. 3. In this manner, the latches 36 may be easily openable from either side to enable the installer to remove or insert a cable or to rearrange the cables without having to remove the latch entirely. It is quite convenient to be able to pivot the latch from either sidewall depending upon which way is most convenient for the installer.

Figure 11:
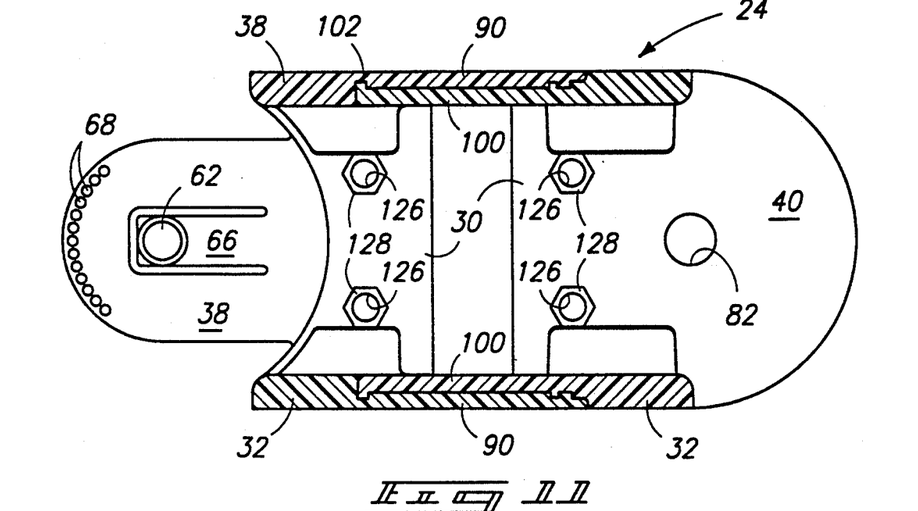
FIG. 11 is horizontal cross-sectional view taken along line 11—11 in FIG. 5.

The base 30 of each member 26, 28 preferably includes mounting apertures 126 (FIG. 11) to enable the units 24 to be readily supported in the overhead arrangement. Each of the mounting apertures 126 includes a bolt head recess 128 for receiving the head of a bolt that may be projected down through the mounting aperture 126 for attaching to supporting structure.

Figure 15:
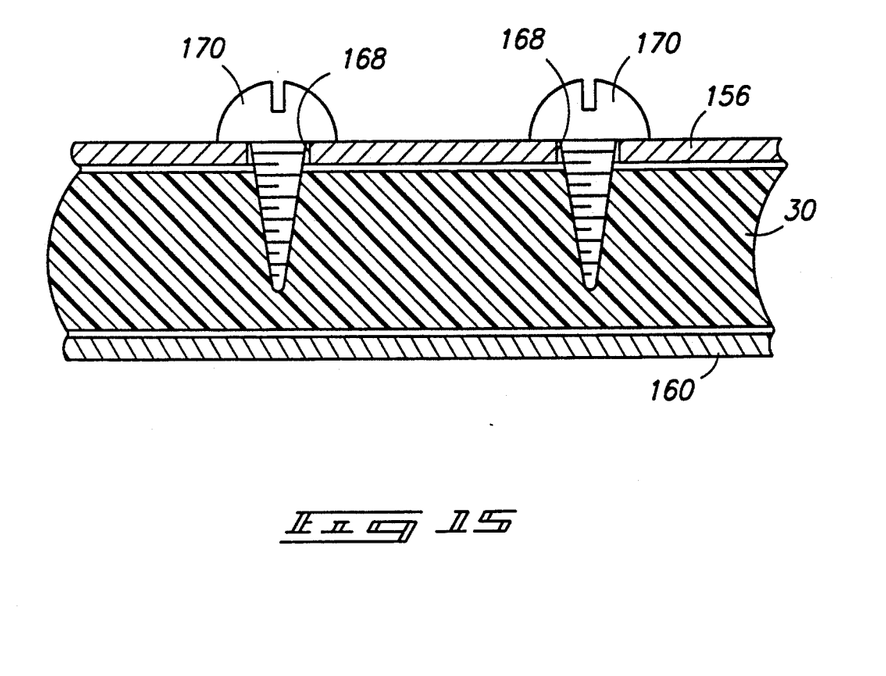
FIG. 15 is a fragmentary vertical cross-sectional view taken along line 15—15 in FIG. 14.

FIG. 13 illustrates a sample "T"-shaped distribution unit 20 having a central portion 140 with a right arm portion 142, a left arm portion 144 and a leg portion 146. Central portion 140 includes a back wall 148 and corner curved walls 150 and 152 for guiding the cables through the distribution point to the selected sections 22. The distribution unit 20 is formed of an inverted "U"-shaped channel material forming a floor 156 and sidewalls 158. Braces 160 extend between the sidewalls at the lower end of the sidewalls forming a cavity 166 between the braces 160 and the floor 156 for receiving ends of the sections 22. The floor 156 at each of the arm portions 142 and 144, and the leg portion 146, includes parallel end slots 164 and 166 for receiving sidewalls 32 of the male or female members 26, 28 as illustrated in FIG. 14. The floor 156 additionally has elongated parallel attachment apertures 168 formed in each of the arm portions 142 and 144, and leg portion 146 for enabling the installer to efficiently attach the ends of the sections 22 to the distribution unit 20. As illustrated in FIG. 15, fasteners 170 may be used for attaching the base 30 of either the male member 26 or the female member 28 to the distribution unit 20.

FIG. 14 is a plan view which shows the ends of the sections being connected to the unit 20. For example, FIG. 14 shows a male member 26 being attached to the unit at the right arm portion 142 and a female member 28 being attached to the left arm portion 144. FIG. 14 illustrates a female member 28 being mounted to the leg portion 146 in a reverse orientation. Such a versatile arrangement enables the installer to easily adjust the length of the sections 22 as desired. The length of the attachment apertures 168 enables the installer to easily adjust the length of the sections. The reversibility and detachability of each of the cable support units 24 enable the designer and installer to readily adjust the length of the section 22 as desired to fit the need of each particular location.

Figure 16:
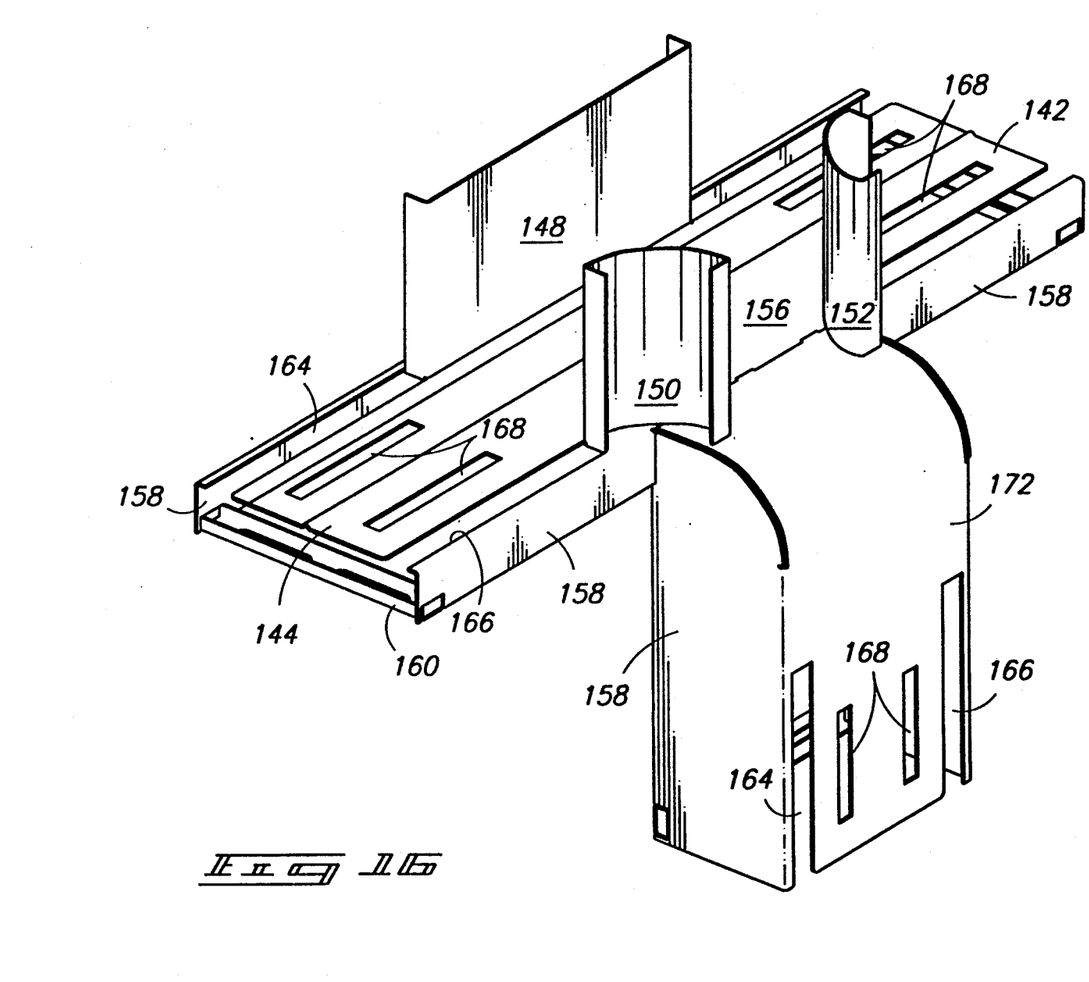
FIG. 16 is an isometric view of a curved "T"-shaped unit for interconnecting with a vertically oriented cable support section.

FIG. 16 illustrates an alternative embodiment of the distribution unit 20 illustrating the leg portion 146 with a downwardly extending segment 172 to enable the "T"-shaped distribution unit 20 to have the additional versatility of attaching to a vertically oriented section 22 in which there is not sufficient room for a normal vertical to horizontal transition.

In compliance with the statute, the invention has been described in language more or less specific as to methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. In a telecommunication overhead cable distribution system having "T"-shaped distribution units at designated distribution locations and cable support sections extending between the distribution locations for distributing telecommunication cables vertically and horizontally to and from telecommunication termination panels while protecting and preventing the telecommunication cables from being bent in an arc of less than a predetermined radius of curvature, in which each cable support section comprises:

a plurality of interconnecting cable support units that are pivotally interconnected to each other for receiving and protecting the telecommunication cables between the "T"-shaped distribution units to enable the cables to be distributed in vertical orientations or horizontal orientations between the distribution locations;

each of the cable support units are articulatively interconnected to enable the units to be selectively pivoted both about a substantially vertical axis and about a substantially horizontal axis relative to the adjacent cable support units to enable the cables to be distributed in the vertical orientation and the horizontal orientation;

each of the cable support units having a male member and a female member that are mounted for pivotal movement relative to each other in a substantially vertical plane about the substantially horizontal axis;

said female member having a female connector element for receiving a complementary male connector element of an adjacent cable support unit to enable the unit to pivot in a substantially horizontal plane about the vertical axis.

2. In a telecommunication overhead cable distribution system as defined in claim 1 wherein the male and female connector elements have complementary abutment means for limiting the pivotal movement of each unit relative to its adjacent cable support unit about the vertical axis to prevent sections from forming an arc having a radius of curvature less than the predetermined radius of curvature to minimize damage to the cables.

3. In a telecommunication overhead cable distribution system as defined in claim 1 wherein each of the male and female connector elements includes a base, upright sidewalls extending upward from the base, and an individual latch extending between the sidewalls defining an enclosure for receiving and protecting the cables.

4. In a telecommunication overhead cable distribution system as defined in claim 1 wherein the male and female connector elements have releasable locking means for interlocking the units together to form the cable support section while enabling each cable support unit to be disconnected.

5. In a telecommunication overhead cable distribution system as defined in claim 1 wherein the substantially horizontal pivot axis and the substantially vertical pivot axis are laterally spaced from each other so that each cable support unit pivots about the substantially horizontal axis intermediate the vertical pivot axis.

6. In a telecommunication overhead cable distribution system as defined in claim 1 wherein each of the female and male members has complementary hinge elements that are operatively interconnected to each other to enable the female and male members to pivot about the substantially horizontal axis intermediate the male and female connector elements.

7. In a telecommunication overhead cable distribution system as defined in claim 1 wherein the male and female members have complementary abutment means for limiting the pivotal movement of male and female members relative to each other about the substantially horizontal axis to prevent the section from forming an arc having a radius of curvature less than the predetermined radius of curvature to minimize damage to the cables.

8. In a telecommunication overhead cable distribution system as defined in claim 1 wherein the male and female connector elements have an interlocking means for releasably interlocking the connector elements to adjacent cable support units and where the male and female members have a horizontal angle adjusting means for releasably securing the cable support unit in a desired fixed angle about the vertical pivot axis.

9. In a telecommunication overhead cable distribution system as defined in claim 8 wherein the releasable interlocking means includes an aperture formed in one of the connector elements and a spring biased projection formed on the other connector element for projecting into the aperture of an adjacent cable support unit to interconnected the adjacent units and wherein the aperture permits the insertion of a tool into the aperture to deflect and disconnect the cable support units.

10. In a telecommunication overhead cable distribution system as defined in claim 9 wherein the horizontal angle adjusting means includes a series of indentations on one of the connecting elements and one or more detents on the other connecting elements for securing the unit in a selected fixed angle about the vertical axis.

11. In a telecommunication overhead cable distribution system as defined in claim 1 wherein each unit has vertical angle adjusting means for securing the male and female members in a selected fixed angle about the substantially horizontal axis.

12. In a telecommunication overhead cable distribution system as defined in claim 1 wherein the "T"-shaped distribution units have sockets for receiving either the male or female connecting elements of the cable support units to interconnect the cable support sections.

* * * * *